(12) United States Patent
Raif et al.

(10) Patent No.: US 8,401,096 B2
(45) Date of Patent: Mar. 19, 2013

(54) COMMUNICATION SYSTEM AND METHOD OF OPERATIONS THEREFOR

(75) Inventors: Menahem Raif, Rishon Le-Zion (IL); Yael Dux, Givat Shmuel (IL); Baruh Hason, Tel Aviv (IL)

(73) Assignee: Motorola Solutions, Inc., Schaumburg, IL (US)

( * ) Notice: Subject to any disclaimer, the term of this patent is extended or adjusted under 35 U.S.C. 154(b) by 610 days.

(21) Appl. No.: 12/376,972

(22) PCT Filed: Sep. 11, 2007

(86) PCT No.: PCT/US2007/078108
§ 371 (c)(1),
(2), (4) Date: Apr. 28, 2010

(87) PCT Pub. No.: WO2008/045645
PCT Pub. Date: Apr. 17, 2008

(65) Prior Publication Data
US 2010/0202543 A1    Aug. 12, 2010

(30) Foreign Application Priority Data
Oct. 6, 2006 (GB) .................................. 0619792.5

(51) Int. Cl.
*H04K 1/10* (2006.01)
(52) U.S. Cl. ........ 375/260; 375/262; 375/267; 375/295; 375/316; 375/343
(58) Field of Classification Search .............. 375/260, 375/262, 267, 340, 343, 346; 455/456.1; 370/280, 203, 204, 205, 208, 209, 210
See application file for complete search history.

(56) References Cited

U.S. PATENT DOCUMENTS

| 2003/0134648 A1 | 7/2003 | Reed et al. |
| 2005/0026563 A1 | 2/2005 | Leeper et al. |
| 2006/0029009 A1 | 2/2006 | Alapuranen et al. |
| 2006/0209734 A1* | 9/2006 | Son et al. ................. 370/312 |

FOREIGN PATENT DOCUMENTS
EP    0250105 A1    12/1987

OTHER PUBLICATIONS

PCT Search Report Dated Apr. 18, 2008.
GB Search Report Dated Jan. 17, 2007.
International Preliminary Report on Patentability and Written Opinion for counterpart International Patent Application No. PCT/US2007/078108 mailed on Apr. 16, 2009.
"Air Interface for Fixed Broadband Wireless Access Systems," 802.16 standard.

* cited by examiner

*Primary Examiner* — Dhaval Patel
(74) *Attorney, Agent, or Firm* — Brian Mancini; Steven A. May

(57) ABSTRACT

A method of operation in a communication system is presented in which a first terminal sends to a second terminal a communication including ranging information by which the second terminal is able to calculate a range between the first terminal and the second terminal. The communication is sent in a plurality of frames. In at least one of the frames ranging information is included in a ranging region of the frame. The size and position of the ranging region is known to the first and second terminals without a ranging information indicator being sent in the frame to indicate the size and position of the ranging region.

10 Claims, 5 Drawing Sheets

COMMUNICATION SYSTEM AND METHOD OF OPERATIONS THEREFOR

FIELD OF THE INVENTION

The present invention relates generally to communications systems. In particular, the present invention relates to wireless communication of ranging information relating to the range or distance between a first terminal and a second terminal.

BACKGROUND OF THE INVENTION

In some communication systems, particularly systems in which communication terminals can be mobile, communication protocols are used in which ranging information relating to the range or distance between a first communication terminal and a second communication terminal is provided in communications between the terminals. Such information is considered to be important since it can be used to synchronize communications in the system as described later.

Examples of systems which employ a protocol in which ranging information is communicated in this way include systems which are proposed to operate in accordance with the 802.16e standard of the IEEE (Institute of Electrical and Electronic Engineers). The 802.16e standard of the IEEE, herein referred to as the '802.16e standard' is an amendment to the 802.16 standard of the IEEE, herein referred to as the '802.16 standard' to extend its applicability. The 802.16 standard entitled 'Air Interface for Fixed Broadband Wireless Access Systems' is the standard which was published by the IEEE on Apr. 8, 2002. It was developed by the 802.16 Working Group of the IEEE working on fixed broadband wireless access in Wireless Metropolitan Area Networks (WMAN). The 802.16 standard defines fixed terminal, point-to-multipoint, communications by BWA (Broadband Wireless Access). The 802.16e standard is the standard which was published by the IEEE on Feb. 28, 2006 entitled 'Physical and Medium Access Control Layers for Combined Fixed and Mobile Operation in Licensed Bands'. It extends operation of the 802.16 standard to wireless broadband connectivity by mobile terminals. The expression '802.16e standard' as used herein includes this published standard and any future amendments or successions to the 802.16e standard published by the IEEE (or any successor standards authority).

Operation according to the 802.16e standard involves use of a form of OFDM modulation to communicate information. OFDM (Orthogonal Frequency Division Multiplexing) is a spread spectrum technology which allows high speed transmission of data via multiple lower speed sub-channels provided by division of the allocated frequency spectrum into sets of modulated sub-carriers.

The form of OFDM used in the protocol defined in the 802.16e standard is OFDMA (Orthogonal Frequency Division Multiple Access'). An OFDMA system is one in which different user terminals operate in the same frequency spectrum and each of these terminals occupies a separate channel.

In OFDMA communications, the available communication resource can be considered as a two dimensional entity and can be represented graphically by a two dimensional map. One dimension represents time and the other dimension represents frequency. Referring to the frequency dimension, the OFDMA sub-carriers are pseudo randomly spread on the entire available frequency spectrum for achieving frequency diversity. A designated group of spread sub-carriers is known as a frequency sub-channel. The time dimension is numbered (counted) in units of symbols, known also as OFDMA symbols. A given number of symbols in the time dimension makes up a frame.

In an OFDMA system the communication resource available is divided between user terminals by assigning a specified set of multiple sub-channels and multiple symbols per user terminal. Thus, the channel occupied by each user terminal is defined in terms of a specified time in which the user terminal occupies a specified sub-set of the sub-carriers defining a specified sub-channel for the specified time.

OFDMA systems such as those operating in accordance with the 802.16e standard require accurate synchronization between communicating terminals. According to known proposals, such synchronization may be achieved as follows. A first terminal, for example one of a plurality of user terminals, sends to a second terminal, for example a base station serving the user terminals, ranging information allowing the second terminal to detect a range or distance between the first and second terminals. The ranging information is received by the second terminal and is used by the second terminal to estimate a timing adjustment needed to be applied by the first terminal. The second terminal sends information relating to the estimated timing adjustment to the first terminal. The timing adjustment is applied by the first terminal so that a signal from the first terminal can arrive at the second terminal at the same time as signals sent from other terminals, e.g. user terminals. Thus, where the second terminal is a base station, it may estimate in this way the range of each user terminal it serves and provide a timing adjustment to each served user station so that incoming signals, known in the art as 'uplink' signals, are received from all served terminals arrive together in synchronization.

SUMMARY OF THE INVENTION

According to the present invention in a first aspect there is provided a method as defined in claim 1 of the accompanying claims.

According to the present invention in a second aspect there is provided a system as defined in claim 10 of the accompanying claims.

Further features of the present invention are as defined in the accompanying dependent claims and are disclosed in the embodiments of the invention to be described.

Embodiments of the present invention will now be described by way of example with reference to the accompanying drawings.

BRIEF DESCRIPTION OF THE DRAWINGS

The accompanying drawings, in which like reference numerals refer to identical or functionally similar elements throughout the separate views and which together with the detailed description below are incorporated in and form part of the specification, serve to further illustrate various embodiments and to explain various principles and advantages of the present invention.

In the accompanying drawings.

Figure 1:
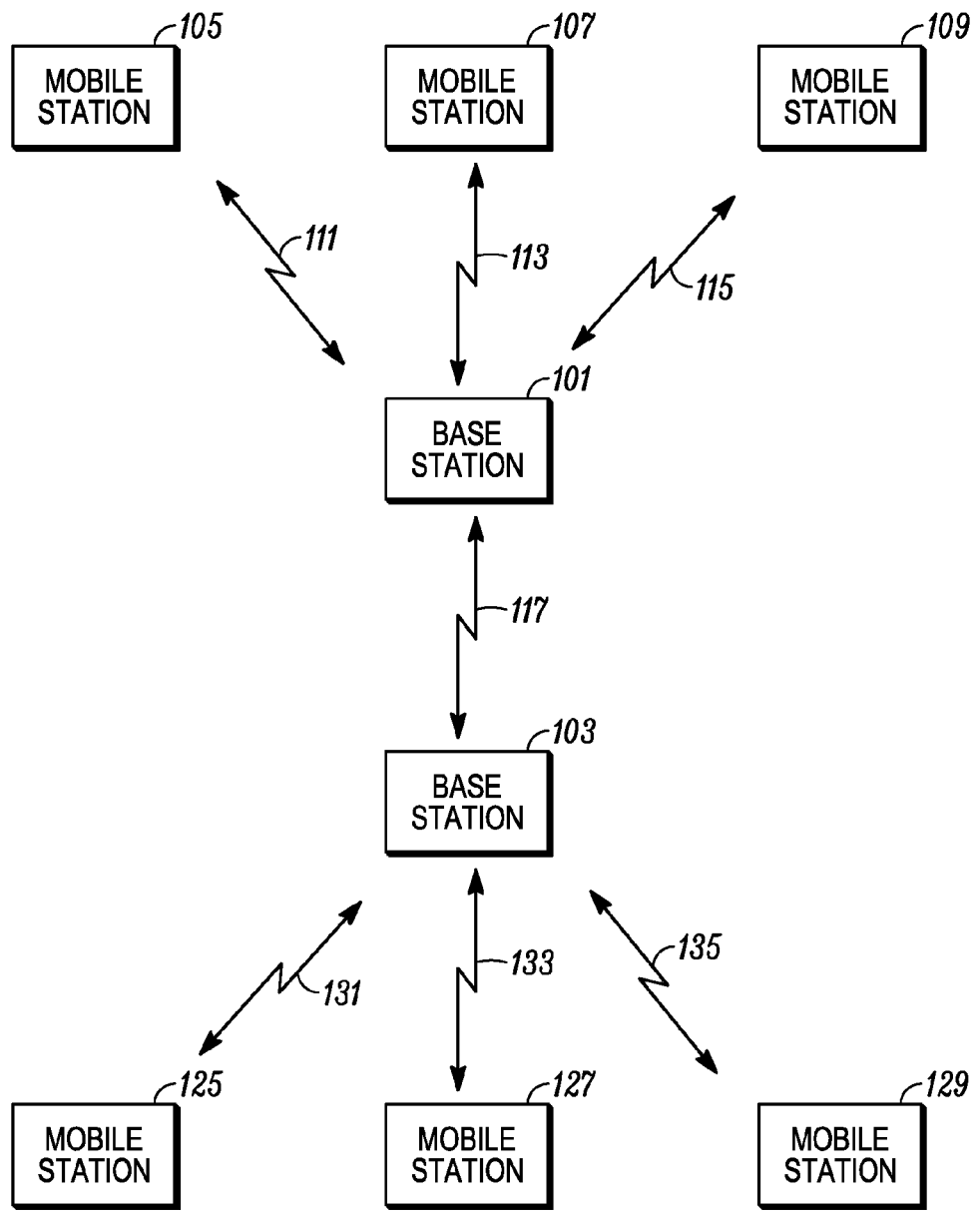
FIG. 1 is a block schematic diagram of a communication system which may be adapted in accordance with an embodiment of the invention.

Skilled artisans will appreciate that elements in the accompanying drawings are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF EMBODIMENTS OF THE INVENTION

Before describing in detail embodiments that are in accordance with the present invention, it should be observed that the embodiments reside primarily in combinations of method steps and apparatus components related to wireless communication of ranging information between a first terminal and a second terminal. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as 'first' and 'second', 'top' and 'bottom', and the like may be used solely to distinguish one entity or action from another entity or action without necessarily requiring or implying any actual such relationship or order between such entities or actions. The terms 'comprises', 'comprising', or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by 'comprises . . . a' does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of wireless communication of ranging information between a first terminal and a second terminal. Any non-processor circuits may include, but are not limited to, a radio receiver, a radio transmitter, signal drivers, clock circuits, power source circuits, and user input devices. As such, these functions may be interpreted as steps of a method of operation to perform wireless communication providing ranging information relating to the distance or range between a first terminal and a second terminal. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As noted earlier, OFDMA systems may employ a protocol in which ranging information between a first terminal and a second terminal is communicated. In such a system in which the first terminal is mobile and the second terminal is a base station, the range between the two can change. An initial ranging procedure may be carried out prior to initiation of normal transmissions between the first terminal and the second terminal. When a communication service has been established between the first terminal and the second terminal, a ranging procedure (periodic ranging') may be carried out periodically by the first terminal, e.g. every m frames where m is an integer greater than one. However, a 'ranging region', which is a part of each frame of communication from the first terminal dedicated for transmitting the ranging information, is scheduled to be included in every such frame, since this region serves different kinds of ranging procedures including both initial ranging and periodic ranging of all user terminals served by the second terminal.

A ranging information indicator, also known as a 'ranging declaration', is also required. It is an indication or declaration specified in a communication from the second terminal of the size and the position in the frames of the communication from the first terminal of the ranging region. The ranging information indicator could be sent in every frame of the communication from the second terminal. The ranging information indicator allows the second terminal easily to find the ranging information when received. The ranging information indicator is included by the second terminal in an overhead portion of a downlink part of the frame, that is a portion in which no user communicated data, referred to in the art as 'data bursts', is sent. Since each frame has a finite size (in the two dimensions referred to earlier), space within the frame occupied by the overhead portion cannot be used for delivery of traffic information. Therefore, provision of the ranging information indicator restricts the throughput of downlink traffic information.

It has been appreciated in connection with the present invention that provision of the ranging information indicator restricts the throughput of downlink traffic information and that the size of the overhead portion can beneficially be reduced by reducing over a plurality of communication frames the amount of the overhead portion occupied by the ranging information indicator employed to indicate the size and position of the ranging region in each associated frame in which ranging information is to be sent by the first terminal to the second terminal. This can be achieved by the first and second terminals knowing the size and position of the ranging region in at least some of the frames, for example by: (i) keeping constant in each uplink frame, or in an uplink part of each frame (where the frame includes a downlink part and an uplink part as described later) the size and position of the ranging region; or (ii) keeping the size of the ranging region constant and moving its position in different frames according to a pattern known to the first and second terminals. This allows the second terminal easily to locate the ranging region in each frame, and to find ranging information if included, without needing to receive the ranging information indicator in each frame. Thus, in some frames, no ranging information indicator is required and can be omitted. In each frame where no ranging information indicator is included, the amount of user data or 'traffic' information that can be included in the frame can beneficially be increased, thereby providing an overall higher rate of user data communication between the terminals.

FIG. 1 is a block schematic diagram of an illustrative communication system 100 which may be adapted in accordance with an embodiment of the present invention. The system 100 may operate using a protocol in accordance with the 802.16e standard as referred to earlier.

The system 100 includes a first base station 101 having radio links with a plurality of user terminals in a service cell or site defined by the position of the base station 101. The user terminals include mobile stations and may also include at least one fixed terminal (not shown), e.g. used by a dispatcher or other operator sending and receiving operational control messages. Three of many possible mobile stations are shown linked to the base station 101, namely mobile stations 105, 107 and 109 having radio links 111, 113 and 115 respectively with the base station 101. The base station 101 thereby serves user terminals including the mobile stations 105, 107 and 109 with radio communications to and from other mobile stations either served by the base station 101 or by other base stations of the system 100 operably linked to the base station 101 or in other systems (not shown) operably linked to the system 100.

The system 100 also includes a second base station 103 having a radio link 117 with the first base station 101. The base station 103 has radio links with a plurality of user terminals in a service cell or site defined by the position of the base station 103. The user terminals include mobile stations and may also include at least one fixed terminal (not shown), e.g. used by a dispatcher or other operator sending and receiving operational control messages. Three of many possible mobile stations are shown linked to the base station 103, namely mobile stations 125, 127 and 129 having radio links 131, 133 and 135 respectively with the base station 103. The base station 103 thereby serves user terminals including the mobile stations 125, 127 and 129 with radio communications to and from other mobile stations either served by the base station 103 or by other base stations of the system 100 operably linked to the base station 103, e.g. the base station 101, or in other systems (not shown) operably linked to the system 100.

Communications between the base station 101 and each of the mobile stations 105, 107 and 109 via the links 111, 113 and 115 respectively are sent by an OFDMA protocol in accordance with the 802.16e standard. Similarly, communications between the base station 103 and each of the mobile stations 125, 127 and 129 via the links 131, 133 and 135 respectively are sent by the same OFDMA protocol.

Figure 2:
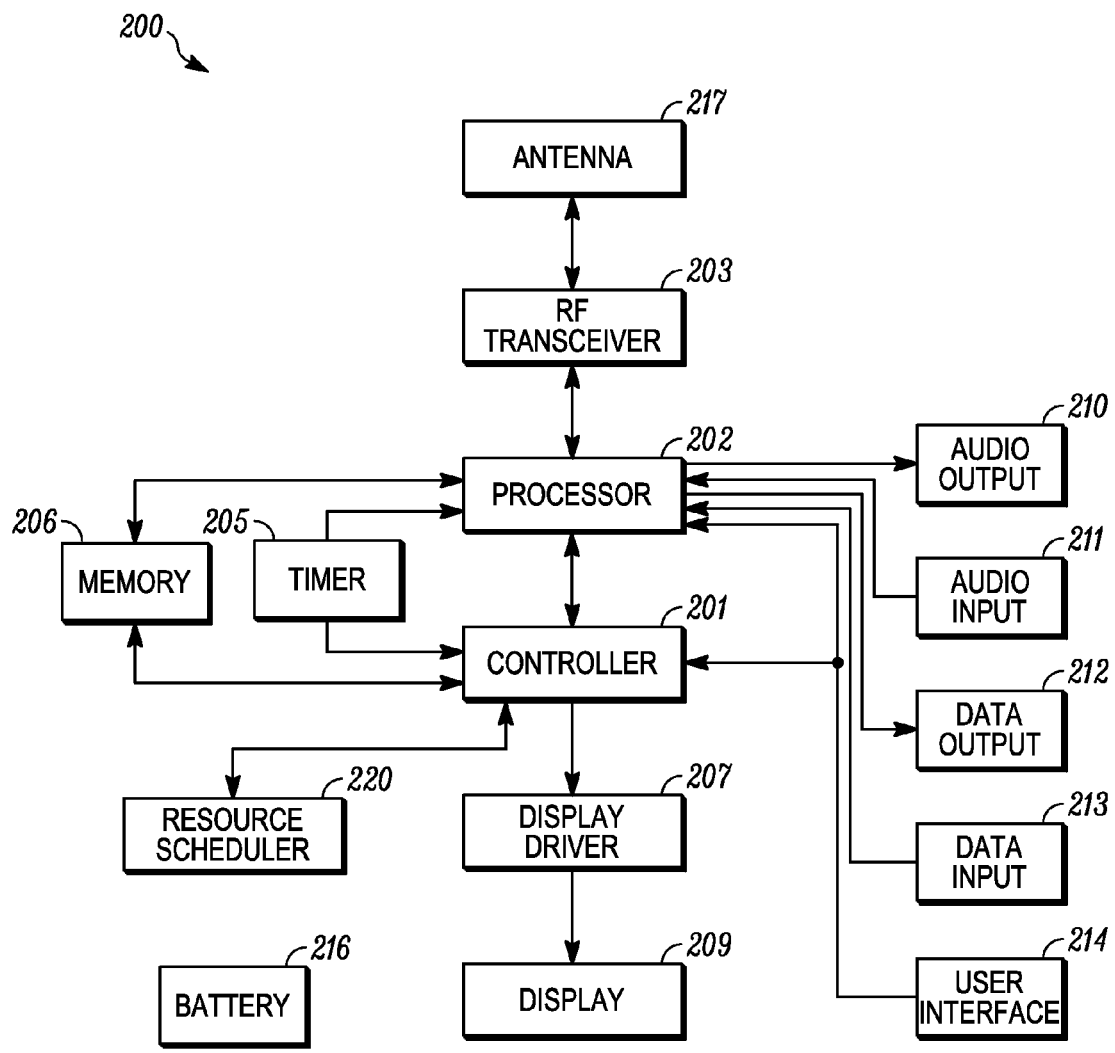
FIG. 2 is a block schematic diagram of an illustrative layout of a mobile station of the system 100.

FIG. 2 shows an illustrative block diagram 200 of operational components in each mobile station (MS) of the system 100, including the mobile stations 105, 107, 109, 125, 127 and 129. As will be apparent to those skilled in the art, the layout of each of the mobile stations may take one of many possible forms, and the block diagram 200 is therefore to be regarded as illustrative rather than definitive. In the block diagram 200, a controller 201 controls functional operations of the MS. A processor 202 operably connected to the controller 201 processes information sent to and from the MS. The controller 201 and the processor 202 are operably connected to a timer 205 which provides operational synchronization and timing and to a memory 206 which stores data and programs needed in operation by the controller 201 and the processor 202.

The processor 202, which may for example comprise a digital processor, which may be included with the controller 201 in a common digital signal processing unit, is operably connected to a radio frequency (RF) transceiver 203 which transmits and receives RF signals including signals carrying information sent to and from the mobile station. The signals are delivered over-the-air to and from an antenna 217 connected to the RF transceiver 203.

When the RF transceiver 203 via the antenna 217 receives an RF signal including information representing communicated speech, the processor 202 extracts the speech information and delivers a signal including the extracted speech information to an audio output 210 which comprises a transducer such as a speaker which converts the signal to audio form to reconstruct the communicated speech for a user of the mobile station having the layout 200. The MS also includes an audio input 211 which comprises a transducer such as a microphone which converts speech of the user into the form of an electrical signal and delivers the signal to the processor 202 which processes the signal into a form suitable for inclusion in an RF signal for transmission by the RF transceiver 203 via the antenna 217.

When the RF transceiver 203 receives via the antenna 217 a signal representing communicated (non-speech) data, e.g. alphanumeric characters representing words or numerals or picture or video information, the processor 202 extracts information relating to the communicated data and delivers a signal including the extracted data to a data output 212. The data output may for example comprise a connection to an external data processing terminal (not shown), e.g. a personal computer.

A data input 213 provides an input signal from a user including data to be communicated. The data input 213 may for example comprise a connection to a data source, e.g. a personal computer (not shown). The signal provided by the data input 213 is delivered to the processor 202 which processes information included in the signal into a form suitable for inclusion in an RF signal to be transmitted by the RF transceiver 203 via the antenna 217.

The MS includes a user interface 214, e.g. a keypad and control buttons, which allows a user to enter instructions and data into the mobile station. The user interface 214 is operably connected to the controller 201 to receive signals representing instructions entered by a user at the user interface 214. The user interface 214 is also operably connected to the processor 202 to enable a signal representing data entered by the user at the user interface 214 to be delivered to the processor 202. The processor 202 processes data included in the signal into a form suitable for inclusion in an RF signal to be transmitted by the RF transceiver 203 via the antenna 217.

The MS includes an electro-optical display 209 operable to display information to a user in a known manner. The display 209 is driven by a display driver 207 under control of the controller 201.

The MS includes a battery 216 which provides a source of electrical energy for all active components of the mobile station.

The MS also includes a resource scheduler 220 operably coupled to the controller 201. The resource scheduler 220 may be incorporated within the controller 201. The resource scheduler 220 carries out functions within the MS relating to scheduling of communications between the MS and the base station serving the MS. In particular, the resource scheduler 220 ensures that transmissions from the MS carried out according to a protocol and in a manner to be described later with reference to FIGS. 4 and 5.

Figure 3:
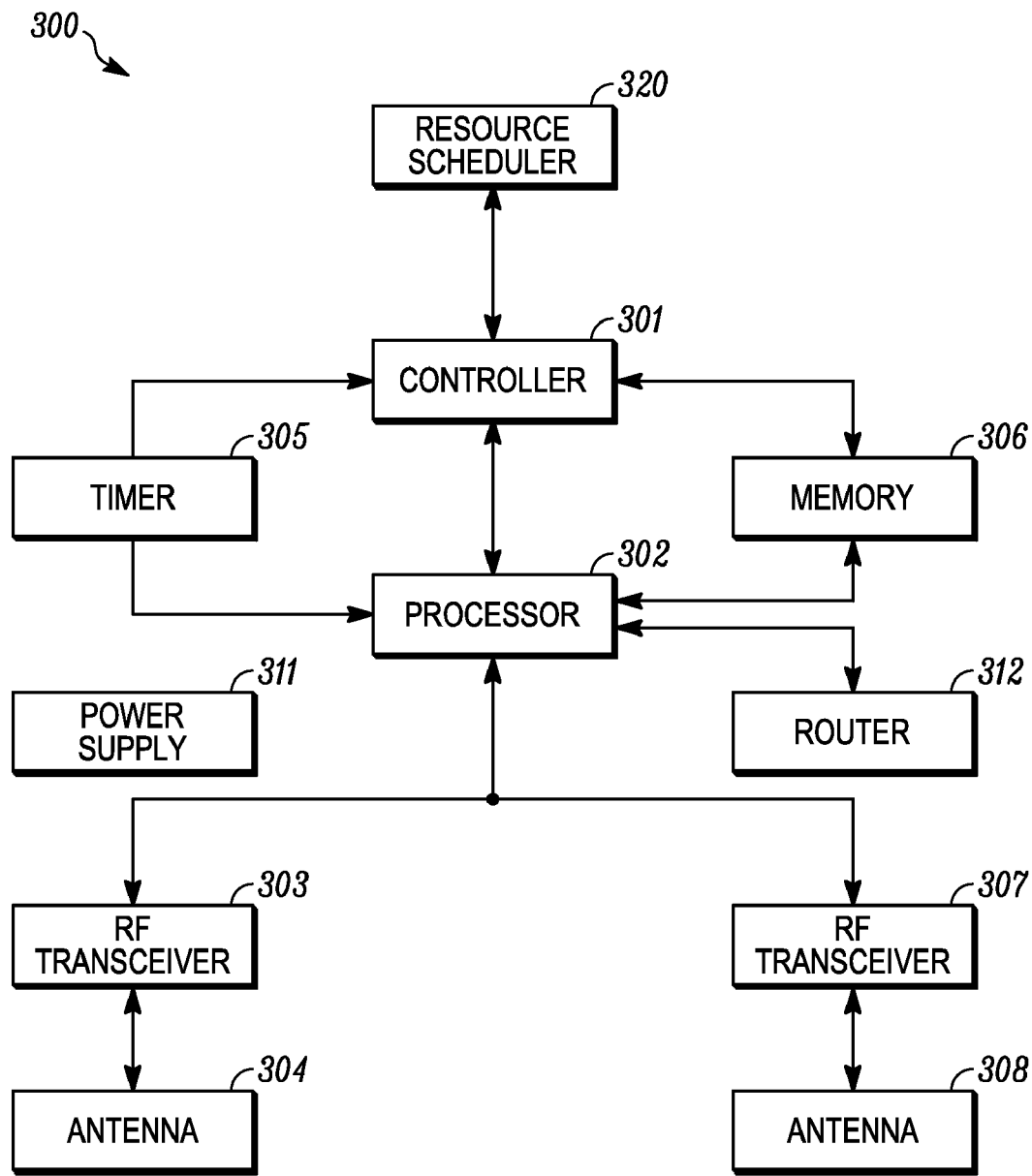
FIG. 3 is a block schematic diagram of an illustrative layout of a base station of the system 100.

FIG. 3 shows an illustrative block diagram 300 of operational components in each of the base station 101 and the base station 103. As will be apparent to those skilled in the art, the layout of each of the base stations 101 and 103 may take one of many possible forms, and the block diagram 300 is therefore to be regarded as illustrative rather than definitive. In the block diagram 300, a controller 301 controls functional operations of the base station. A processor 302, e.g. a digital signal processor, operably connected to the controller 301 processes information sent in RF signals to and from the base station. The controller 301 and the processor 302 are operably connected to a timer 305 which provides operational synchronization and timing and to a memory 306 which stores data and programs needed in operation by the controller 301 and the processor 302.

The processor 302 is operably connected to a plurality of RF transceivers two of which are shown, namely an RF transceiver 303 and an RF transceiver 307. Each of the RF transceivers 303 and 307 transmits and receives RF signals including signals carrying information sent to and from user terminals including mobile stations served by the base station. The signals are delivered over-the-air to and from an antenna 304 connected to the RF transceiver 303 and to and from an antenna 308 connected to the RF transceiver 307.

When the RF transceiver 303 receives via the antenna 304 an RF signal including information representing communicated speech or data, the signal is passed to the processor 302. Similarly, when the RF transceiver 307 receives via the antenna 308 an RF signal including information representing communicated speech or data, the signal is passed to the processor 302. The processor 302 converts each signal including communicated information from the transceiver 303 or the transceiver 307 into an electronic signal including communicated information. The communicated information includes system control information and user communicated information for onward delivery. Where the communicated information comprises system control information the electronic signal produced by the processor 302 is passed to the controller 301. Where the electronic signal produced by the processor 302 comprises user communicated information for onward delivery it is delivered to a router 312 which routes the electronic signal toward its destination, e.g. via a link to another base station (such as via the link 117) or to a mobile station (other than the originator of the information) served by the base station via the processor 302. Similarly, each incoming electronic signal received at the router 312 from a source other than the processor 302 which includes communicated user information, i.e. to be sent to one of the user terminals including mobile stations served by the base station having the layout 300, is routed by the router 312 to the processor 302. The processor 302 processes each electronic signal which it receives from the router 312 into a form suitable for inclusion in an RF signal for transmission by the RF transceiver 303 via the antenna 304 or for transmission by the RF transceiver 307 via the antenna 308.

The processor 302 also prepares and receives system control messages and data received from the controller 301 to be sent to the mobile terminals served by the base station.

The base station of the block diagram 300 includes a power supply 311, e.g. from the main (mains) electricity supply, which provides a source of electrical energy for all active components of the base station.

Although the base station of the block diagram 300 is shown in FIG. 3 as having two RF transceivers connected respectively to two antennas 304 and 308, it could have one combination or alternatively more than two combinations of RF transceivers and antennas.

The base station of the block diagram 300 also includes a resource scheduler 320 operably coupled to the controller 301. The resource scheduler 320 may be incorporated within the controller 301. The resource scheduler 320 carries out functions within the base station relating to scheduling of communications between the base station and mobile stations served by the base station. In particular, the resource scheduler 320 specifies the structure of communication frames according to a protocol and in a manner to be described later with reference to FIGS. 4 and 5.

As noted earlier, wireless communication between each of the base stations of the system 100 and each of the mobile stations served by each base station uses an OFDMA protocol in accordance with the 802.16e standard. Generally, the 802.16e standard allows two possible modes of duplexing between downlink and uplink communications. These are respectively a TDD (Time Division Duplex) mode and an FDD (Frequency Division Duplex) mode.

The TDD mode, which is likely to become the most widely used of the two modes in relation to the 802.16e standard, uses the same carrier frequency for both uplink and downlink transmissions and each successive frame occurring in time consists of a downlink sub-frame, in which communication from the base station to each given mobile station takes place, followed by an uplink sub-frame within the same frame in which communication from each given mobile station to the base station takes place. So transmissions by the base station and each of the mobile stations are half duplex, i.e. occur for a designated part of each frame. The duty cycle (ratio of sub-frame length or duration) between the downlink sub-frame and the uplink sub-frame can be configured, e.g. as 70/30, 50/50, 30/70 etc.

The FDD mode uses different carrier frequencies for downlink and uplink transmissions, so that transmission by the base station are full duplex, that is the base station can make downlink transmissions whilst uplink transmissions are taking place. In this case, uplink transmissions and downlink transmissions are divided into frames having a fixed duration.

Figure 4:
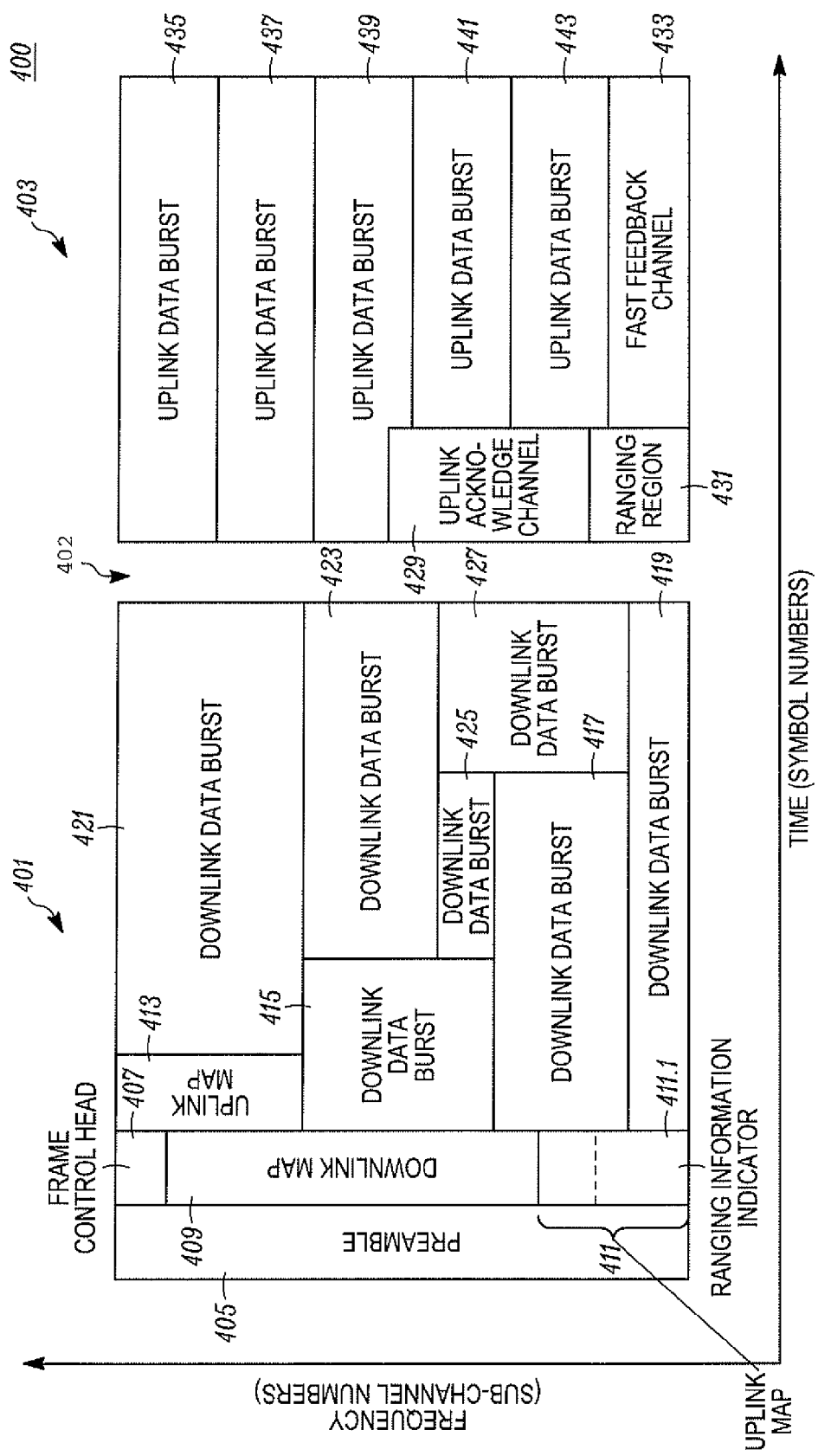
FIG. 4 is an illustrative frame of a communication sent in the communication system between one of the base stations of the system and one of the mobile stations served by the base station.

FIG. 4 shows an illustrative frame 400 used in the communication system 100 in communication between one of the base stations of the system 100 and one of the mobile stations served by the base station. The frame 400 as shown in FIG. 4 can be considered as an area of a graph of frequency plotted in units of numbers of sub-channels versus time. The frame 400 is an illustrative frame of the TDD mode which includes a downlink sub-frame 401 in which information (data) is sent only from the base station to the mobile station followed by an uplink sub-frame 403 in which information (data) is sent only from the mobile station to the base station. A guard space 402 may separate the sub-frames 401 and 403. Each of the sub-frames 401 and 403 is a rectangular space in which OFDM symbol numbers in a symbol number sequence are plotted horizontally and sub-channel logical numbers are plotted vertically. Thus, each of the sub-frames 401 and 403 is made up of a number of areas each occupied by information (data) sent in the communication. A unit of area in each of the sub-frames 401 and 403 is known as a 'slot'. In the downlink sub-frame 401, a slot consists of a rectangle having dimensions of two OFDM symbols by one sub-channel. In the uplink sub-frame 403 a slot consists of a rectangle having dimensions of three OFDM symbols (an 'OFDM triplet') by one sub-channel.

An illustrative structure of each of the downlink sub-frame 401 and the uplink sub-frame 403 is shown in FIG. 4. The illustrative structure of the downlink sub-frame 401 includes in a first column (first symbol pair) a vertically extending area 405 including information known as a 'Preamble' which is used for synchronization of the mobile station with the base station. Areas 407, 409 and 411 are formed in the next column (next OFDM symbol pair). The area 407 comprises a 'Frame Control Head' ('FCH') which provides information relating to lengths of Downlink MAP (DL-Map) messages, coding schemes used and usable sub-channels. The area 409 comprises information known as a 'Downlink MAP' ('DL-Map') and the area 411 comprises information known as an 'Uplink MAP' ('UL-MAP'). The Uplink Map extends into an area 413 occupying part of the next column (next OFDM symbol pair). The areas 409 and 411 and 413 define the access to the downlink and uplink resource respectively, relating to the frame 400. In the illustrative structure of the sub-frame 401, the ranging information indicator referred to earlier is included, in selected frames only, in a sub-area 411.1 of the Uplink MAP of the area 411. The remainder of the downlink sub-frame is occupied by data bursts (traffic information) in areas 415 to 427 respectively.

The ranging information indicator (ranging declaration) of the sub-area 411.1 of the area 411 is a part of the Uplink Map referred to in the 802.16e standard as an Information Element ('IE'). The 802.16e standard specifies that the ranging information indicator (ranging declaration) shall be in the first Information Element of the Uplink Map. Within this definition, the exact position of the ranging information indicator (ranging declaration) may be selected by a system designer to be suitably located in the Uplink Map, e.g. of the areas 411 and 413 in the illustrative structure of the frame 400. The ranging information indicator (ranging declaration) typically requires 52 bits which is slightly more than one downlink communication slot. The base station may use a typical repetition rate of four to send the ranging information indicator in the Uplink Map, e.g. in the sub-area 411.1 of the downlink sub-frame 403. In other words, the base station may transmit the same information four times consecutively in each frame in which the information is sent in order to increase the probability of receipt of the information by a mobile station when in an area of poor radio coverage. Thus, with such a repetition rate, more than four slots of the downlink sub-frame 401 are employed in the sub-area 411.1 to send the ranging information indicator in the selected frames when the ranging information indicator is transmitted.

In the illustrative structure of the uplink sub-frame 403, a first column (first OFDMA triplet) includes an area 429 which comprises an 'Uplink Acknowledge' ('UL ACK') area in which system control information is sent by the mobile station. The first column also includes a ranging region 431 which is the ranging region (referred to earlier) of the sub-frame 403. The ranging region 431 is an area allocated for sending the ranging information referred to earlier to be employed by the base station to calculate a range or distance between the mobile station and the base station in order to establish synchronization between the two terminals. An area 433 occupies a small part of the next column (next OFDM symbol triplet) of the illustrative structure of the sub-frame 403 and extends to occupy a similar part of subsequent columns (subsequent OFDM symbol triplets) of the sub-frame 403. The area 433 is a 'Fast Feedback Channel' allocated for the mobile station to feed back channel state information. The remainder of the uplink sub-frame 403 is occupied by data bursts, i.e. traffic information (or possibly other system control information not included in areas already mentioned) in areas 435 to 443 respectively.

The areas 407 to 413 of the downlink sub-frame 401 and the areas 429 to 433 of the uplink sub-frame 403 carry specialized system control information and can be considered to represent overhead in the frame 400. The areas 415 to 427 and 435 to 443 carry traffic information (and possibly also non-specialized control information).

In the frame 400, the ranging information indicator referred to earlier is included in selected frames in the Uplink Map of the downlink sub-frame 401, comprising the areas 411 and 413 of the illustrative structure of the downlink sub-frame 401, and the ranging information to which it relates is in the ranging region 431 of the uplink sub-frame 403. There are four kinds of ranging procedures that may take place, and so there are four kinds of ranging information that may be sent at different times in an uplink sub-frame 403. Each kind of ranging information when transmitted is contained within the ranging region 431. The four different ranging procedures in which different kinds of ranging information are provided are as follows:

initial ranging; this is provided by mobile stations entering the system 100 for the first time;

handoff ranging; this is similar to initial ranging and is provided by mobile stations entering a new cell as a result of a cell-to-cell handoff (handover) procedure;

periodic ranging; this is intended for maintaining already established synchronization between a mobile station and a base station;

bandwidth request ranging; this is provided by a mobile station when its is making an initial request for a specific service.

Where the ranging information is periodic ranging information it does not need to be sent in every frame. It may, for example, be sent once every m frames, where m is an integer greater than one, e.g. eight. However, the ranging region 431, which is dedicated for transmitting the ranging information, is scheduled, by co-operation of the resource scheduler 320 of the base station and the resource scheduler of the mobile station, to be present in every frame 400, since the ranging region 431 serves the different kinds of ranging mentioned above. The same structure of the frame 400 containing the ranging region 431 may be used by multiple mobile stations communicating with the same base station, so it is convenient for all such mobile stations to use the same ranging region 431 in each of their uplink sub-frames to send ranging information.

As noted earlier, the composition of the frame 400 shown in FIG. 4 is illustrative, and the size and/or position of one or more of the areas 407 to 413 of the downlink sub-frame 401 and the areas 429 to 433 of the uplink sub-frame 403 may be varied from what is shown in the frame 400 of FIG. 4. The size and/or position may vary from one frame to the next. In some frames one or more of the areas shown in FIG. 4 may be absent. However, as noted earlier, the ranging region 431 is present in every uplink sub-frame 403.

In accordance with an embodiment of the present invention, in at least some frames in a sequence of frames, e.g. having the structure of the frame 400, the base station and the mobile station know the position and size of the ranging region for inclusion of ranging information in the uplink sub-frame, e.g. in the uplink sub-frame 403, of such frames. The ranging information indicator is thereby not sent in a downlink sub-frame associated with such frames, e.g. the downlink sub-frame 401 in the same frame 400. This allows more of the downlink sub-frame to be occupied by data bursts comprising traffic information (or possibly other non-specialized information), thereby in such frames allowing a greater overall speed of delivery of downlink traffic information.

The size and position of the ranging region, e.g. the ranging region 431 in the frame 400, allocated in all frames for ranging information to be sent when required in selected frames may be known to the base station and the mobile station because the size and position of the ranging region are fixed in the uplink sub-frame 403 in such frames. In the block diagram 300, the size and position of the ranging region may be specified by the resource scheduler 320 of the base station and implemented by the resource scheduler 220 of the mobile station. The size and position of the ranging region are not restricted to the size and position of the ranging region 431 shown in FIG. 4. The ranging region can in general be fixed anywhere in the uplink sub-frame 403, provided (in the embodiment described) that its shape and size conform with the requirements of the 802.16e standard, that is its height is six, or an integral multiple of six, OFDMA sub-channels, and its width is one or more OFDMA symbol triplets.

Alternatively, the size and/or position of the ranging region, e.g. as provided by the ranging region 431 in the frame 400, may be varied in at least some selected frames according to a pattern known to the base station and the mobile station, e.g. known to the schedulers 320 and 220. For example, the size of the ranging region may be kept constant in the selected frames but the position of the ranging region may be shifted in a pattern known to the base station and the mobile station.

As noted earlier, the ranging information indicator (ranging declaration) is included in selected frames but not in other frames. In other words, the ranging information indicator is sent less frequently than once every frame even though the ranging region, e.g. the ranging region 431, appears in every frame. For example, the ranging information indicator may be included once in every consecutive set of n frames, e.g. n frames 400, but not in other frames of the set, where n is an integer number equal to two or more. The number n may conveniently be selected to be between forty and one thousand. For example, if the frames have a periodicity of five milliseconds in accordance with the 802.11 standard, selecting n to be between forty and one thousand corresponds to including the ranging information indicator in the downlink sub-frame once every q milliseconds, where q is a number between two hundred and five thousand. A suitable example of a rate of sending the ranging information indicator in a downlink sub-frame, e.g. the sub-frame 401, is once every second. In any event, in the described embodiment, the rate of sending the ranging information indicator is not less than once every ten seconds, as required in accordance with the 802.16e standard.

The number n may be fixed or variable. Where the number is variable it may be adjusted dynamically by the base station, e.g. the scheduler 320, according to current system operation conditions.

Where the mobile station is periodically sending ranging information once every m frames and the base station is sending the ranging information indicator once every n frames, there will be n divided by m frames in each of which ranging information is sent by the mobile station without a ranging information indicator being sent (in an associated frame, e.g. the same frame) by the base station. For example, where m is eight and n is two hundred, there will be twenty five such frames in each set of two hundred such frames.

The benefits of the embodiments of the invention described above may be illustrated by the following example. As noted earlier, the ranging information indicator typically occupies more than four slots of the downlink sub-frame as illustrated by the area 411.1 of the downlink sub-frame 401. Thus, more than four slots may be freed in each selected frame in which the ranging information indicator is not transmitted. If, for example, the frames 400 have a length of five milliseconds and an error correction rate is used in which for every five data bits an extra bit is added as error correction code, and the periodicity of sending the ranging information indicator is once every eight frames, the freed capacity obtained by not sending the ranging information indicator is equivalent to more than one hundred and fifty kilobytes per second in the gross downlink data throughput. Of course, the freed capacity can be increased by sending the ranging information indicator less frequently than once every eight frames.

Figure 5:
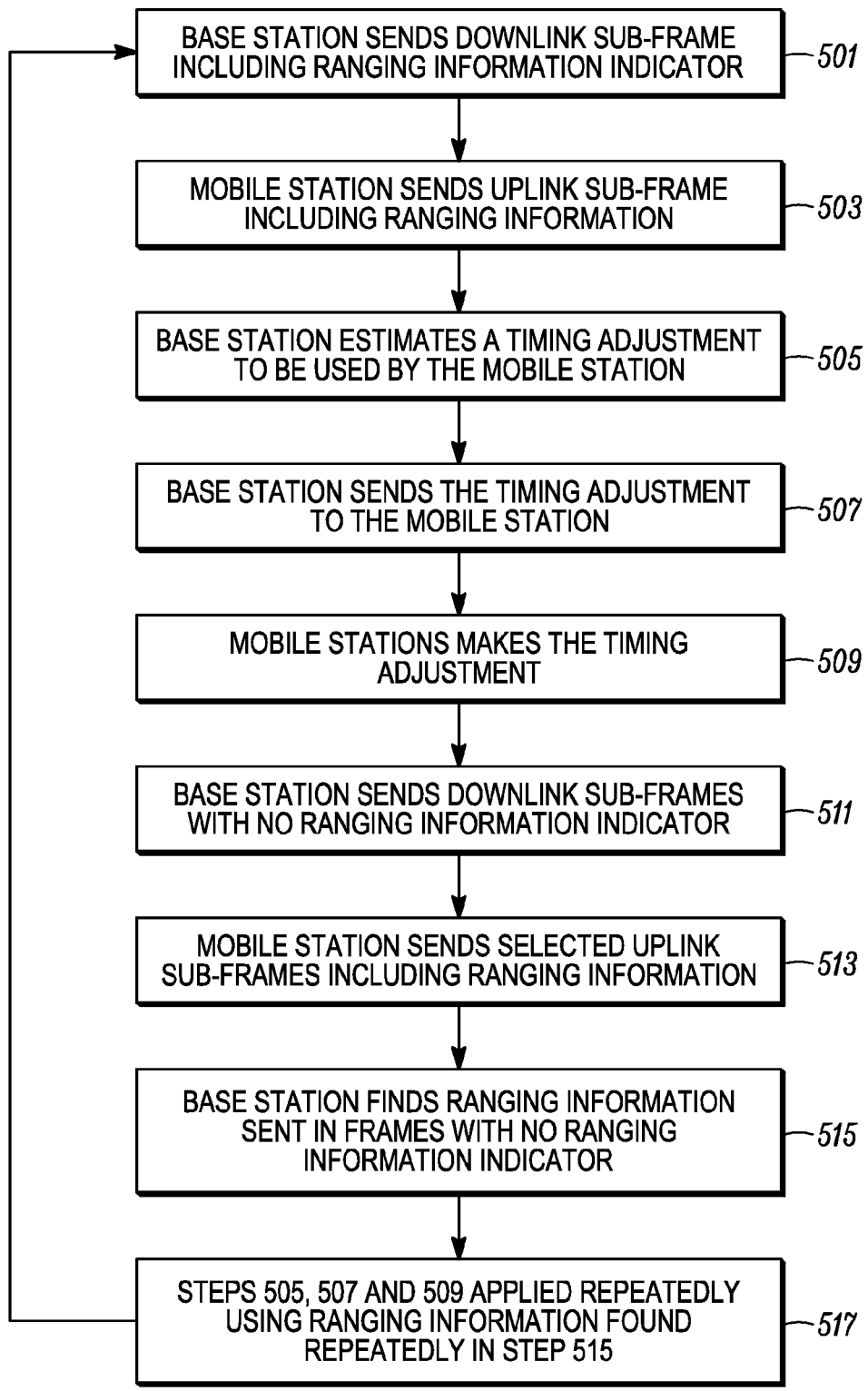
FIG. 5 is a flow chart of a method embodying the invention.

FIG. 5 is a flow chart of a method 500 summarising the embodiments of the invention which have described above. A base station, e.g. the base station 501, is communicating with a mobile station served by the base station, e.g. the mobile station 105. In a step 501, the base station sends in a first frame of a series of n frames, where n is as defined earlier, a downlink sub-frame including a ranging information indicator; this indicates the size and position of the ranging region in the following uplink sub-frames to be sent by the mobile station. The ranging information indicator may for example be established by the resource scheduler 320 and may be sent in the Uplink Map comprising the areas 411 and 413 of the downlink sub-frame 401 shown in FIG. 4, e.g. in the sub-area 411.1. In a step 503, the mobile station sends in the uplink sub-frame of the same frame ranging information in the ranging region, e.g. in the ranging region 431 of the sub-frame 403. The position and size of the ranging region of the ranging information sent in step 503 may be set by the resource scheduler 220 to be as specified in the ranging information indicator sent in step 501. In a step 505, the base station finds the ranging information sent in step 503 and estimates a timing adjustment to be used by the mobile station so that uplink sub-frames from the mobile station and from other mobile stations served by the base station arrive at the same time at the base station. In a step 507, the base station sends the timing adjustment to the mobile station in the downlink sub-frame of the next frame. In a step 509, the mobile station, upon receiving the timing adjustment sent in step 509, makes the timing adjustment to the next uplink sub-frame sent by the mobile station. In a step 511, in each of the next n−1 frames following the frame in which the downlink sub-frame is sent in step 501, the base station sends a downlink sub-frame with no ranging information indicator included. In a step 513, the mobile station sends in selected uplink sub-frames, e.g. once in every eight successive sub-frames, of the n−1 frames in which no ranging information indicator is included in an associated one of the downlink sub-frames, ranging information included in the ranging region of such selected sub-frames. Thus, the uplink sub-frames sent in step 513 are in selected frames of the set of frames in which downlink sub-frames are sent in step 511 with no ranging information indicator. In a step 515, the base station finds the ranging information sent in each of the selected uplink sub-frames of step 513, which were in selected frames in which no ranging information was included. The base station is able to find the ranging information in each of these uplink sub-frames because the base station and the mobile station, e.g. the resource schedulers 320 and 220, both know the position and size of the ranging region, e.g. the ranging region 431, in each of these uplink sub-frames without frame-by-frame communication of this information in a ranging information indicator. The base station and the mobile station may both know the position and size of the ranging region because the position and size of the ranging region are the same in each of these uplink sub-frames, e.g. as previously indicated by the ranging information indicator sent in step 501. In a step 517, repeated application of steps 505, 507 and 509 is applied (once every m frames) using the ranging information repeatedly found by the base station in step 515. Eventually, following completion of step 517, all steps of the method 500 are repeated, e.g. with a suitable periodicity, e.g. n frames per cycle, where n is as defined earlier, e.g. between forty and one thousand.

In the embodiments of the invention which have been described, it is convenient, from a system design point of view, for the size and position of the ranging region allocated in each frame of a plurality of frames for sending of ranging information from each mobile station to a given base station serving the mobile stations to be the same for uplink subframes of all of the mobile stations. For example, the size and position of the ranging region may be constant from frame-to-frame for all of the mobile stations. Furthermore, where, as in the system 100, several base stations each serve mobile stations, it is desirable for the size and position of the ranging region allocated in each frame of a plurality of frames for sending of ranging information from each of the mobile stations to each of the base stations to be the same for the uplink sub-frames of all of the mobile stations to all of the base stations.

Although the embodiments of the invention which have been described above with reference to FIGS. 4 and 5 are implemented by operation in the TDD mode, in alternative embodiments implementation may be by operation in the FDD mode. In the FDD mode, as noted earlier, downlink transmissions are sent by the base station in downlink frames on one carrier frequency and uplink transmissions are sent by the mobile station in uplink frames on a different carrier frequency. In this case, the base station may send downlink transmissions in a full duplex manner in consecutive frames, whereas the mobile stations may send uplink transmissions in a full duplex or a half duplex manner. In implementation of embodiments of the invention in the FDD mode, the same principles are applied as for implementation in the TDD mode as described above. Thus, the downlink frames sent by the base station in the FDD mode implementation may have a structure similar to the downlink sub-frame 400, and the uplink frames sent by the mobile station in the FDD implementation may have a structure similar to the uplink sub-frame 403. As in the uplink sub-frames 403 of the TDD mode implementation, selected uplink frames in the FDD mode implementation may include a ranging region the size and position of which is known to the base station and the mobile station, e.g. by the scheduler 320 and the scheduler 220. As for the downlink sub-frames 401 in the TDD mode implementation, some but not all periodic selected downlink frames, e.g. one in every n downlink frames where n is as defined earlier, in the FDD mode implementation may include the ranging information indicator in the Uplink Map relating to the ranging region in the selected uplink frames.

In the foregoing specification, specific embodiments of the present invention have been described. However, one of ordinary skill in the art appreciates that various modifications and changes can be made without departing from the scope of the present invention as set forth in the accompanying below. Accordingly, the specification and drawings are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this patent application and all equivalents of those claims as issued.

The invention claimed is:

1. A method of operation in a communication system, the method comprising:
   sending, by a second terminal to a first terminal, a communication in a plurality of frames including a ranging information indicator to indicate to the first terminal a size and position of a ranging region;
   sending, by the first terminal to the second terminal, a communication in a plurality of frames which includes the ranging region, wherein the ranging region includes ranging information which the second terminal uses to calculate a range between the first terminal and the second terminal; and
   wherein, in at least one of the plurality of frames of the communication sent from the first terminal and subsequent to the second terminal sending to the first terminal the ranging information indicator, the size and position of the ranging region are known to the first and second terminals without the ranging information indicator being sent in an associated frame of the communication from the second terminal.

2. A method according to claim 1 wherein:
   every one of the plurality of frames of the communication from the first terminal has a ranging region allocated for the sending of ranging information from the first terminal to the second terminal; and
   the ranging information is sent from the first terminal to the second terminal in at least one of the frames of the communication from the first terminal but not in at least one other of the frames of the communication.

3. A method according to claim 2 wherein at least one of the size and position of the ranging region in each frame of the plurality of frames of the communication from the first terminal is constant over the frames of the plurality of frames.

4. A method according to claim 1 wherein the ranging information indicator is included in some selected frames of the plurality of frames of the communication from the second terminal but not in other selected frames of the plurality of frames.

5. A method according to claim 1 wherein the first and second terminal communicate in at least one of:
   a time division duplex mode using a plurality of common communication frames, wherein each of the frames of the plurality of common communication frames includes a first sub-frame for communication of data from the second terminal to the first terminal and a second sub-frame for communication of data from the first terminal to the second terminal; and
   a frequency division duplex mode using different carrier frequencies.

6. A method according to claim 4 wherein the ranging information indicator is included in one frame in a given set of n frames of the plurality of frames of the communication from the second terminal, but not in other frames of the set, where n is an integer number equal to two or more.

7. A method according to claim 1 wherein the communication from the second terminal includes in each frame a data burst portion and an overhead portion and the ranging information indicator is included in the overhead portion of selected frames.

8. A method according to claim 1 which includes the second terminal using ranging information obtained periodically from the communication from the first terminal to estimate the range between the first terminal and the second terminal and the second terminal periodically sending to the first terminal a timing adjustment to allow the communication to be adjusted in time.

9. A method according to claim 8 wherein:
   several terminals are communicating with the second terminal and the timing adjustment allows the communication from the first terminal to be synchronized with communications from other terminals sent to the second terminal;
   the first terminal is a mobile station and the second terminal is a base station; and
   the base station is operable to communicate with each of a plurality of mobile stations using a multiple access protocol, wherein the multiple access protocol is an orthogonal frequency division multiple access communication protocol.

10. A communication system comprising:

an at least one base station that sends, to a plurality of mobile stations, a ranging information indicator to indicate a size and position of the ranging region and wherein the size and position of the ranging region allocated for sending of ranging information from the mobile station to the base station is constant for each frame of a plurality of frames and is the same for all of the mobile stations;

the plurality of mobile stations, wherein the plurality of mobile stations send a plurality of frames that include the ranging region, wherein the ranging region includes ranging information which allows the at least one base station to calculate ranges between the plurality of mobile stations and the base station; and wherein, subsequent to the at least one base station sending the ranging information indicator, the size and position of the ranging region are known to the plurality of mobile stations without the ranging information indicator being sent in subsequent frames of communications from the at least one base station.

* * * * *